(12) United States Patent (10) Patent No.: US 12,609,895 B2

Kim et al. (45) Date of Patent: Apr. 21, 2026

(54) SOURCE ROUTING APPARATUS AND METHOD IN ICN

(71) Applicant: ELECTRONICS AND TELECOMMUNICATIONS RESEARCH INSTITUTE, Daejeon (KR)

(72) Inventors: Hak Suh Kim, Daejeon (KR); Nam Seok Ko, Daejeon (KR); Sun Me Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 643 days.

(21) Appl. No.: 17/992,889

(22) Filed: Nov. 22, 2022

(65) Prior Publication Data

US 2023/0216785 A1     Jul. 6, 2023

(30) Foreign Application Priority Data

Jan. 5, 2022     (KR) ........................ 10-2022-0001628

(51) Int. Cl.
H04L 45/00 (2022.01)
H04L 45/121 (2022.01)

(52) U.S. Cl.
CPC ............ H04L 45/34 (2013.01); H04L 45/121 (2013.01); H04L 45/20 (2013.01)

(58) Field of Classification Search
CPC ...................................................... H04L 45/34
See application file for complete search history.

(56) References Cited

U.S. PATENT DOCUMENTS

| | | | | |
|---|---|---|---|---|
| 9,124,538 B2* | 9/2015 | Koponen | ................ | H04L 45/38 |
| 9,832,031 B2* | 11/2017 | Zhao | ................... | H04L 43/0811 |
| 9,882,724 B2 | 1/2018 | Hyun et al. | | |
| 2013/0111063 A1* | 5/2013 | Lee | ....................... | H04L 45/125 |
| | | | | 709/241 |
| 2016/0119159 A1* | 4/2016 | Zhao | ...................... | H04L 47/15 |
| | | | | 370/390 |

(Continued)

FOREIGN PATENT DOCUMENTS

| | | |
|---|---|---|
| CN | 109451080 A | 3/2019 |
| KR | 1020130048032 A | 5/2013 |

(Continued)

OTHER PUBLICATIONS

Pier Luigi Ventre et al., "Segment Routing: A Comprehensive Survey of Research Activities, Standardization Efforts, and Implementation Results", IEEE Communications Surveys & Tutorials, vol. 23, No. 1, First Quarter 2021. pp. 182-221.

*Primary Examiner* — Guang W Li

(74) *Attorney, Agent, or Firm* — Rabin & Berdo, P.C.

(57) ABSTRACT

Disclosed herein a source routing apparatus and method in ICN. The method includes: receiving an interest packet; extracting a current entry value when the received interest packet includes a forwarding hint; using the extracted current entry value as an index of a path list; extracting a name of the interest packet; reducing the current entry value when the interest packet is transmitted to a network area of the path list; performing a FIB lookup with the extracted name; determining an output port using the FIB lookup; and transmitting the interest packet to the output port.

16 Claims, 6 Drawing Sheets

100

(56)                    References Cited

U.S. PATENT DOCUMENTS

| | | | | |
|---|---|---|---|---|
| 2016/0205034 A1* | 7/2016 | Solis | H04L 47/83 709/226 |
| 2017/0264536 A1* | 9/2017 | Wood | H04L 45/74591 |
| 2018/0019877 A1 | 1/2018 | Koo | |
| 2018/0026883 A1* | 1/2018 | Wood | H04L 45/028 370/392 |
| 2018/0041438 A1* | 2/2018 | Wood | H04L 45/306 |
| 2018/0109454 A1* | 4/2018 | Holmberg | H04L 45/74591 |
| 2018/0241669 A1* | 8/2018 | Muscariello | H04L 63/0807 |
| 2018/0242218 A1* | 8/2018 | Muscariello | H04W 24/08 |
| 2018/0278522 A1* | 9/2018 | Asati | H04L 45/64 |
| 2018/0302323 A1* | 10/2018 | Moiseenko | H04L 67/63 |
| 2019/0199633 A1* | 6/2019 | Azgin | H04L 67/63 |
| 2020/0396668 A1* | 12/2020 | Muscariello | H04L 1/0017 |
| 2021/0377168 A1* | 12/2021 | Xie | H04L 45/16 |
| 2022/0417140 A1* | 12/2022 | Mendes | H04W 40/14 |
| 2025/0062984 A1* | 2/2025 | Filsfils | H04L 45/02 |

FOREIGN PATENT DOCUMENTS

| | | | |
|---|---|---|---|
| KR | 101506849 B1 | 3/2015 |
| KR | 101773716 B1 | 9/2017 |
| KR | 1020210093787 A | 7/2021 |
| KR | 1020210102107 A | 8/2021 |

* cited by examiner

FIG. 3

```
Interest = INTEREST-TYPE TLV-LENGTH
           Name
           [CanBePrefix]
           [MustBeFresh]
           [ForwardingHint]          310
           [Nonce]
           [InterestLifetime]
           [HopLimit]
           [ApplicationParameters [InterestSignature]]
```

FIG. 4

Forwarding Hint

| Preference | Name |
|------------|------|
| 0 | /test/a |
| 1 | /etri/network |
| 20 | /sport/golf |
| 100 | /dcn/service |

410          420

Forwarding Hint

SOURCE ROUTING APPARATUS AND METHOD IN ICN

CROSS REFERENCE TO RELATED APPLICATION

The present application claims priority to Korean Patent Application No. 10-2022-0001628 filed Jan. 5, 2022, the entire contents of which is incorporated herein for all purposes by this reference.

BACKGROUND OF THE INVENTION

1. Field of the Invention

The present disclosure relates to a source routing apparatus and method, and more particularly, to technology of a source routing apparatus and method in an information centric network (ICN).

2. Description of the Related Art

An information centric network (hereinafter referred to as ICN) method is being conducted as a future Internet structure study to overcome the limitations of the existing IP-based Internet. In order to use this new type of networking method as a main method, various services used in the existing Internet structure shall be well accommodated.

An IP network and an ICN perform hop-by-hop forwarding to a next destination based on an IP address or content name through a network layer protocol of layer 3. A packet is transmitted to a next path by extracting destination information included in the packet from a FIB table built in a router in advance and performing lookup. All forwarding processes are performed based on FIB information built in the individual router, so it is impossible to know in advance through which path a packet will be transmitted to a final destination. Due to this structure, detailed traffic control for packets is impossible. In order to overcome this shortcoming, in the network, a source routing technology for transmitting a packet through a path determined in advance by several metrics in a source node of the network has been developed.

However, since a conventional ICN network does not support source routing, there is a high possibility that it is an obstacle to the spread of network technology in the future, and thus there is a problem that users have difficulties.

SUMMARY OF THE INVENTION

An object of the present disclosure is to provide a method for adding a path through which a packet needs to pass when a source node generates the packet in order to support source routing and processing an interest packet having source routing information in an individual router.

Other objects and advantages of the present disclosure may be understood by the following description, and will become more clearly understood by the embodiments of the present disclosure. Moreover, it will be readily apparent that the objects and advantages of the present disclosure may be realized by the means and combinations thereof described in the claims.

According to another embodiment of the present disclosure, there is provided a source routing method in an information centric network (ICN), the source routing method comprising: receiving an interest packet; extracting a current entry value when the received interest packet includes a forwarding hint; using the extracted current entry value as an index of a path list; extracting a name of the interest packet; reducing the current entry value when the interest packet is transmitted to a network area of the path list; performing a FIB lookup with the extracted name; determining an output port using the FIB lookup; and transmitting the interest packet to the output port.

According to the embodiment of the present disclosure in the method, the method may further comprise: extracting a name of the interest packet when the interest packet does not include the forwarding hint; and looking up a FIB with the extracted name and transmitting the interest packet to a next path.

According to the embodiment of the present disclosure in the method, the method may further comprise performing basic forwarding hint processing when a last entry is 0.

According to the embodiment of the present disclosure in the method, the method may further comprise reducing the current entry value by one when the interest packet is transmitted to the network area of the path list.

According to the embodiment of the present disclosure in the method, the performing the FIB lookup with the extracted name further may comprise extracting a name of an entry with highest priority from the forwarding hint and performing the FIB lookup.

According to the embodiment of the present disclosure in the method, the name of the forwarding hint is extracted and the FIB lookup may be performed when a name included in the interest packet and a name included in the forwarding hint conflict.

According to the embodiment of the present disclosure in the method, the forwarding hint may further comprise a current entry and a last entry.

According to the embodiment of the present disclosure in the method, the current entry may refer to an index of a path to be currently processed among all paths, and the last entry may refer to the number of entries of an entire path list.

According to the embodiment of the present disclosure in the method, the network area may be set equally in at least one node.

According to the embodiment of the present disclosure in the method, the determining the next path may further comprise determining, as a next path, a path having a shortest delay time among a plurality of paths.

According to another embodiment of the present disclosure, there is provided a source routing apparatus in an information centric network (ICN). The source routing apparatus comprises an input port configured to receive an interest packet; a routing processor; and an output port configured to output an interest packet to next path. The routing processor is configured to extract a current entry value when the received interest packet includes a forwarding hint, use the extracted current entry value as an index of a path list, extract a name of the interest packet, reduce the current entry value when the interest packet is transmitted to a network area of the path list, perform a FIB lookup with the extracted name, and determine a next path using the FIB lookup.

According to another embodiment of the present disclosure, there is provided A source routing apparatus in an information centric network (ICN). The source routing apparatus comprises a transceiver configured to transmit and receive an interest packet and to transmit the interest packet to a next path; a processor; and a memory configured to store routing information. The processor is configured to extract a current entry value when the received interest packet includes a forwarding hint, use the extracted current entry value as an index of a path list, extract a name of the interest packet, reduce the current entry value when the interest packet is transmitted to a network area of the path list, perform a FIB lookup with the extracted name, and determine a next path using the FIB lookup.

The features briefly summarized above for this disclosure are only exemplary aspects of the detailed description of the disclosure which follow, and are not intended to limit the scope of the disclosure.

The technical problems solved by the present disclosure are not limited to the above technical problems and other technical problems which are not described herein will be clearly understood by a person (hereinafter referred to as an ordinary technician) having ordinary skill in the technical field, to which the present disclosure belongs, from the following description.

BRIEF DESCRIPTION OF THE DRAWINGS

The above and other objects, features and other advantages of the present invention will be more clearly understood from the following detailed description taken in conjunction with the accompanying drawings, in which:

FIG. 3 is a view showing a structure of an interest packet according to an embodiment of the present disclosure;

FIG. 4 is a view showing a structure of a forwarding hint according to an embodiment of the present disclosure;

DESCRIPTION OF THE PREFERRED EMBODIMENTS

Figure 1:
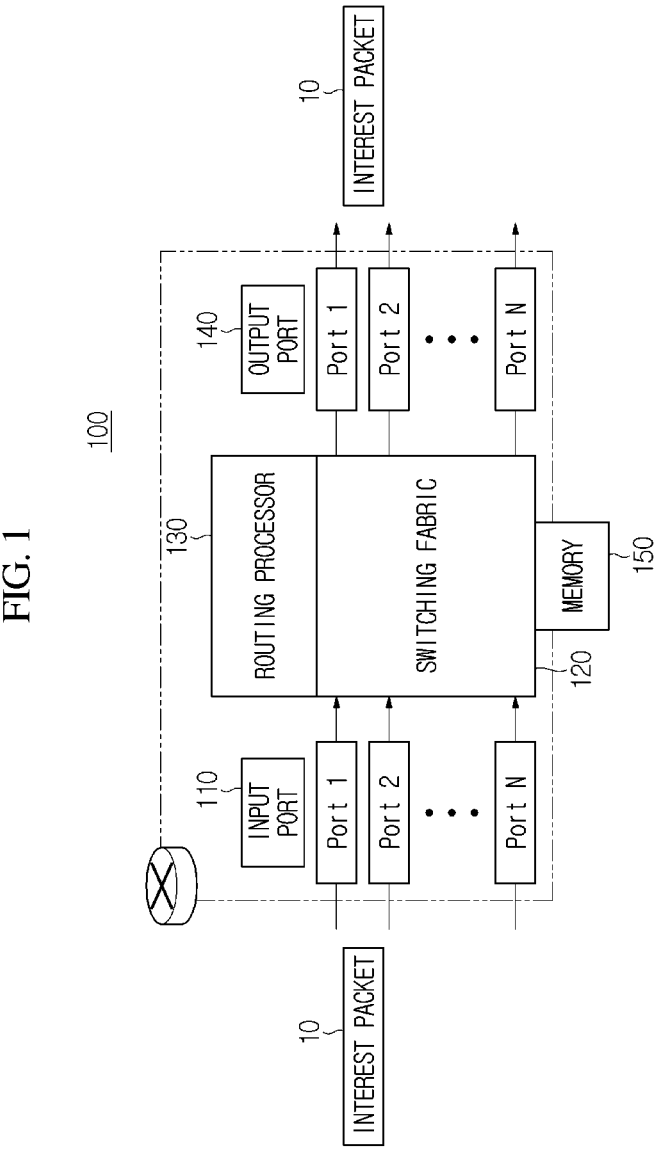
FIG. 1 is a view showing a configuration of a source routing apparatus according to an embodiment of the present disclosure.

Hereinafter, exemplary embodiments of the present disclosure will be described in detail with reference to the accompanying drawings so that those skilled in the art may easily implement the present disclosure. However, the present disclosure may be implemented in various different ways, and is not limited to the embodiments described therein.

In describing exemplary embodiments of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element "includes" or "has" another element, this means that one element may further include another element without excluding another component unless specifically stated otherwise.

In the present disclosure, the terms first, second, etc. are only used to distinguish one element from another and do not limit the order or the degree of importance between the elements unless specifically mentioned. Accordingly, a first element in an embodiment could be termed a second element in another embodiment, and, similarly, a second element in an embodiment could be termed a first element in another embodiment, without departing from the scope of the present disclosure.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements, and some of them may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

The advantages and features of the present invention and the way of attaining them will become apparent with reference to embodiments described below in detail in conjunction with the accompanying drawings. Embodiments, however, may be embodied in many different forms and should not be constructed as being limited to example embodiments set forth herein. Rather, these embodiments are provided so that this disclosure will be complete and will fully convey the scope of the invention to those skilled in the art.

In the present disclosure, each of phrases such as "A or B", "at least one of A and B", "at least one of A or B", "A, B or C", "at least one of A, B and C", ""at Each of the phrases such as "at least one of A, B or C" and "at least one of A, B, C or combination thereof" may include any one or all possible combinations of the items listed together in the corresponding one of the phrases.

Hereinafter, the present disclosure will be described in greater detail with reference to the drawings.

FIG. 1 is a view showing a configuration of a source routing apparatus according to an embodiment of the present disclosure.

Referring to FIG. 1, the source routing apparatus 100 includes an input port 110, a switching fabric 120, a routing processor 130, an output port 140 and a memory 150.

The source routing apparatus 100 may be a router.

The router is a device that performs routing. Routing refers to a path selection process that systematically determines a method of transmitting a message to a destination using an address over a network.

The input port 110 receives an interest packet 10 from the outside.

The switching fabric 120 refers to a structure connecting the input port 110 and the output port 140.

The routing processor 130 extracts a current entry value when the received interest packet includes a forwarding hint, uses the extracted current entry value as an index of a path list, extracts a name of the interest packet, reduces the current entry value when the interest packet is transmitted to a network area of the path list, performs FIB lookup with the extracted name, and determines a next path using the FIB lookup.

When the interest packet does not include the forwarding hint, the routing processor 130 extracts the name of the interest packet and performs FIB lookup with the extracted name, and transmit the interest packet to the output port.

When a last entry is 0, the routing processor 130 performs basic forwarding hint processing.

When the interest packet is transmitted to the network area of the path list, the routing processor 130 reduces the current entry value by one.

The routing processor 130 extracts a name of an entry with highest priority from the forwarding hint and performs FIB lookup.

When the name included in the interest packet and the name included in the forwarding hint conflict, the routing processor 130 extracts the name of the forwarding hint and performs FIB lookup.

The forwarding hint further includes a current entry and a last entry. The current entry refers to an index of a path to be currently processed among all paths and the last entry refers to the number of entries in an entire path list.

The network area is set equally in at least one node.

The output port 140 outputs the interest packet 10 to the next path.

The memory 150 stores data according to a control instruction from the routing processor 130.

The routing processor 130 stores routing information in the memory 150.

Figure 2:
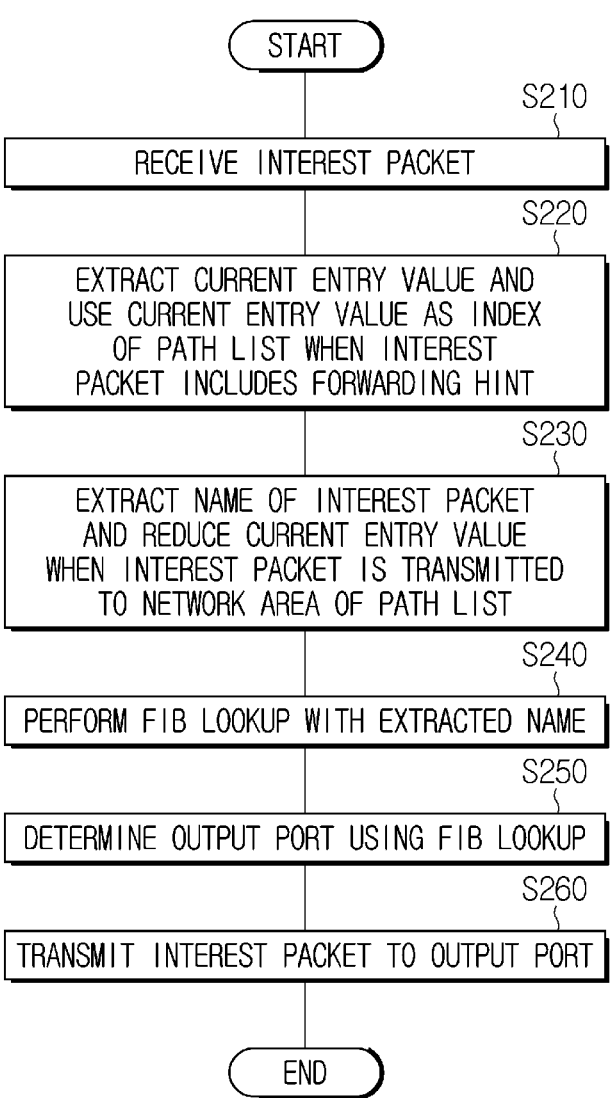
FIG. 2 is a flowchart illustrating a source routing method according to an embodiment of the present disclosure.

FIG. 2 is a flowchart illustrating a source routing method according to an embodiment of the present disclosure. The present disclosure is performed by the source routing apparatus.

First, an interest packet is received (S210).

When the received interest packet includes a forwarding hint, a current entry value is extracted and the extracted current entry value is used as an index of a path list (S220).

A name of the interest packet is extracted and, when the interest packet is transmitted to the network area of the path list, the current entry value is reduced (S230).

An FIB lookup is performed with the extracted name (S240).

An output port is determined using the FIB lookup (S250).

The interest packet is transmitted to the output port (S260).

FIG. 3 is a view showing a structure of an interest packet according to an embodiment of the present disclosure.

Segment Routing technology of an IP network is based on an IPV6 address, and, when a path is determined by a predefined metric, the determined path information is added in the form of an IPV6 address. An individual router uses this added path information to send a packet to a next path and transmit the packet to a final destination.

The ICN transmits information in an interest packet and a data packet, and, when the interest packet is transmitted to a destination, a path is found by looking up FIB information and PIT information is generated for each router. When a data packet is transmitted from the destination to the source node in the future, the data is transmitted to the source node based on the PIT information. Therefore, if the interest packet is controlled, the data packet is transmitted through a reverse path, and thus using the source routing technology is very advantageous for traffic control.

The interest packet has a structure shown in FIG. 3, and a name is a mandatory field and the remaining fields are optional. Accordingly, the remaining fields may not be used when not needed. Source routing according to the present disclosure refers to a packet structure and packet processing technology to enable source routing by using the forwarding hint 310 among the options defined in FIG. 3.

FIG. 4 is a view showing a structure of a forwarding hint according to an embodiment of the present disclosure.

The structure of FIG. 4 is a currently defined basic structure, and consists of a preference 410 and a name 420. The preference indicates priority, and the name indicates a network name. An ICN router extracts the name of FIG. 3 from the received interest packet and performs a FIB lookup.

As shown in FIG. 4, when the interest packet includes a forwarding hint, the router extracts a name of an entry with high priority and performs FIB lookup. Here, high priority means a smallest preference value.

Specifically, the network area information is described along with the priority. The router, which has received the interest packet including the forwarding hint, first finds a name with highest priority defined in the forwarding hint and looks up the forwarding table.

For example, preference 0 has higher priority than preference 1.

Accordingly, /test/a is found before /etri/network.

When the name included in the interest packet and the name included in the forwarding hint conflict, the name included in the forwarding hint is extracted and transmitted to a next destination through the FIB lookup.

Figure 5:
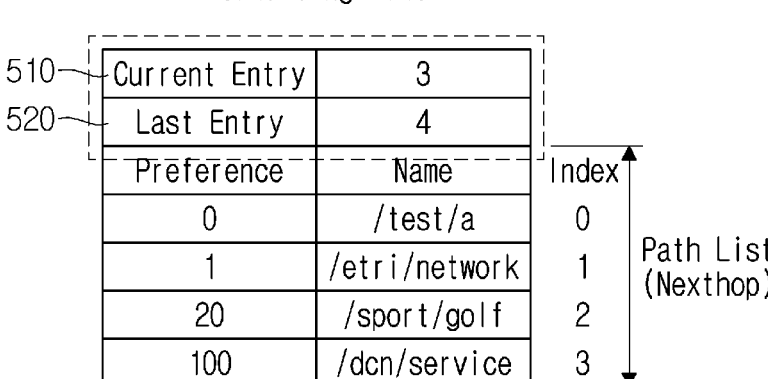
FIG. 5 is a view showing a structure of a forwarding hint for source routing according to an embodiment of the present disclosure.

FIG. 5 is a view showing a structure of a forwarding hint for source routing according to an embodiment of the present disclosure.

As shown in FIG. 5, current entry 510 and last entry 520 fields are added to the existing forwarding hint structure consisting of the preference and the name of FIG. 4. The added fields are configured in the same TLV format as the existing field. The meanings of the added fields are as follows.

The current entry refers to an index of a path to be currently processed among all paths.

The last entry means the number of entries in an entire path list.

The current entry field indicates the index of the entire list and starts from 0 or 1.

In the present disclosure, it is assumed that it starts from 0. The preference and name of the forwarding hint are used as a list of moving paths in the present disclosure. The structure of FIG. 5 may use a forwarding hint in the same manner as before, or may be used according to the method of the present disclosure.

Figure 6:
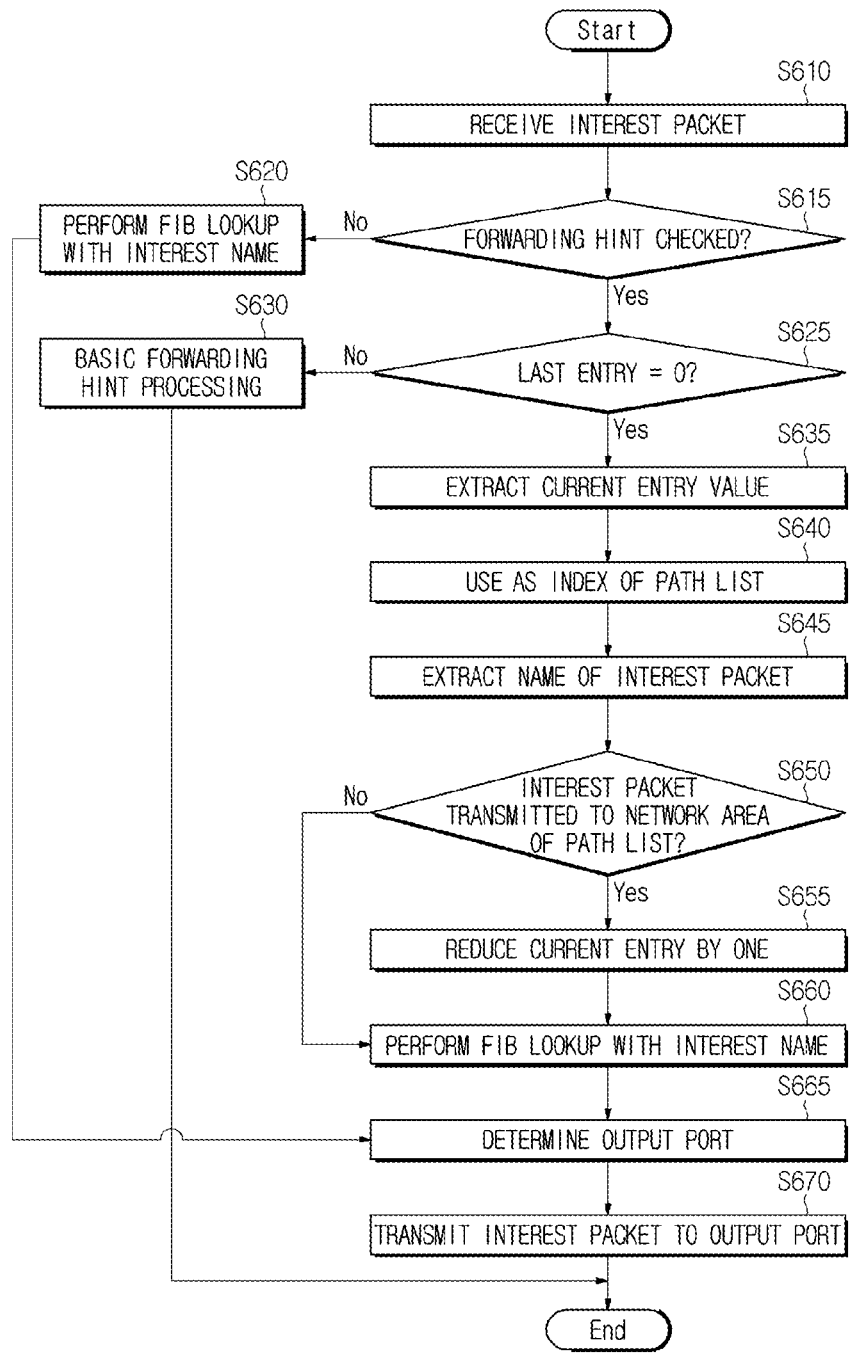
FIG. 6 is a flowchart illustrating an interest packet processing method according to an embodiment of the present disclosure.

FIG. 6 is a flowchart illustrating an interest packet processing method according to an embodiment of the present disclosure. The present disclosure is performed by the source routing apparatus.

As shown in FIG. 6, first, an interest packet is received (S610).

When the received interest packet includes a forwarding hint (S615), it is checked whether a last entry is 0 (S625).

When the received interest packet does not include a forwarding hint (S615), a FIB lookup is performed with the interest name (S620).

A name is extracted from the interest packet and a FIB lookup is performed using the extracted name.

It is checked whether the last entry is 0 (S625).

When the last entry is not 0 (S625), a current entry value is extracted (S635).

When the last entry is 0, basic forwarding hint processing is performed (S630).

In addition, when a last entry field is not present, basic forwarding hint processing is performed.

The extracted current entry value is used as an index of a path list (S640).

A name of the interest packet is extracted (S645).

When the interest packet is transmitted to the network area of the path list (S650), the current entry value is reduced (S655). The current entry value is reduced by one.

When the interest packet is not transmitted to the network area of the path list (S650), the FIB lookup is performed with the name (S660).

The FIB lookup is performed with the extracted name (S660).

An output port is determined using the FIB look up (S665).

An output port for transmission to a network area is determined.

The interest packet is transmitted to the output port (S670).

According to the present disclosure, when finding a path described in the path list and transmitting the interest packet, control of the interest packet is possible.

According to the present disclosure, the network area may be set equally in multiple nodes or only one node.

According to the present disclosure, by exchanging detailed traffic engineering information including a delay time of each path in an ICN routing protocol and using this information to generate a FIB table, traffic control according to service characteristics is possible.

For example, it is possible to provide a low-delay service even in an ICN by finding a path with a shortest delay time among route information and sending an interest packet.

Figure 7:
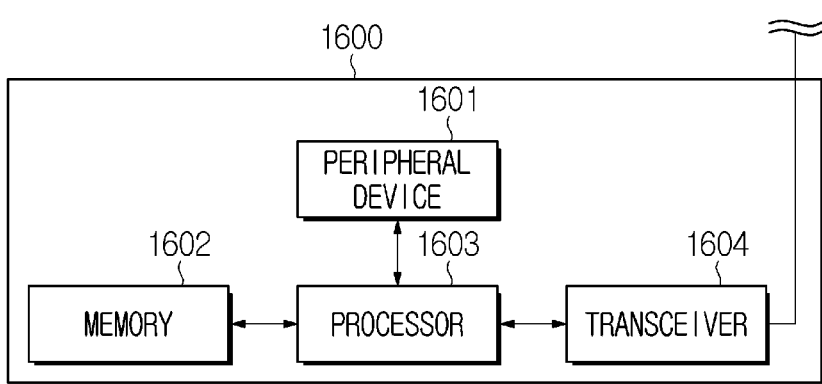
FIG. 7 is a view showing a source routing apparatus according to an embodiment of the present disclosure.

FIG. 7 is a view showing a source routing apparatus according to an embodiment of the present disclosure.

Referring to FIG. 7, the source routing apparatus will be described. The source routing apparatus includes a device. The device 1600 may include a memory 1602, a processor 1603, a transceiver 1604 and a peripheral device 1601. In addition, for example, the device 1600 may further include other components and is not limited to the above-described embodiment. In this case, for example, the device may operate based on the above-described virtual source routing method.

More specifically, the device 1600 of FIG. 6 may be an exemplary hardware/software architecture such as an NDN device, an NDN server or a content router. In this case, as an example, the memory 1602 may be a non-removable memory or a removable memory. Also, as an example, the peripheral device 1601 may include a display, a GPS, or other peripheral devices, and is not limited to the above-described embodiment.

Also, as an example, the above-described device 1600 may include a communication circuit like the transceiver 1604, and may communicate with an external device based thereon.

Also, as an example, the processor 1603 may include at least one of a general-purpose processor, a digital signal processor (DSP), a DSP core, a controller, a microcontroller or one or more microprocessor associated with application specific integrated circuits (ASICs), field programmable gate array (FPGA) circuits, any other tangible integrated circuits (ICs) and a state machine. That is, it may be a hardware/software component for controlling the above-described device 1600.

At this time, the processor 1603 may execute computer-executable instructions stored in the memory 1602 to perform various essential functions of the router. For example, the processor 1603 may control at least one of signal coding, data processing, power control, input/output processing, or communication operations. Also, the processor 1603 may control a physical layer, a MAC layer, and an application layer. Also, as an example, the processor 1603 may perform authentication and security procedures at an access layer and/or an application layer, and is not limited to the above-described embodiment.

For example, the processor 1603 may communicate with other apparatuses through the transceiver 1604. As an example, the processor 1603 may control the apparatus to communicate with other apparatus over a network through execution of computer-executable instructions. That is, communication performed in the present disclosure may be controlled. As an example, other apparatuses may be NDN servers, content routers and other devices. For example, the transceiver 1604 may transmit an RF signal through an antenna, and may transmit the signal based on various communication networks.

In addition, as an example, MIMO technology, beam-forming, etc. may be applied as the antenna technology, and is not limited to the embodiment. In addition, the signal transmitted and received through the transceiver 1604 may be modulated and demodulated and controlled by the processor 1603, and is not limited to the above-described embodiment.

The various embodiments of the present disclosure are not intended to list all possible combinations but are intended to illustrate representative aspects of the present disclosure, and the details described in various embodiments may be applied independently or in combination of two or more.

According to an embodiment of the present disclosure, detailed path control is possible through source routing in an ICN. Including traffic engineering information can enable packet delivery according to service characteristics.

According to an embodiment of the present disclosure, since forwarding using an existing forwarding hint without change is also possible, there is no problem in interworking with the existing legacy ICN router. When a source node performs detailed traffic control according to service characteristics and generates and sends packets, it is possible to support various services.

It will be appreciated by persons skilled in the art that that the effects that can be achieved through the present disclosure are not limited to what has been particularly described hereinabove and other advantages of the present disclosure will be more clearly understood from the detailed description.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some of the steps.

The various embodiments of the present disclosure are not a list of all possible combinations and are intended to describe representative aspects of the present disclosure, and the matters described in the various embodiments may be applied independently or in combination of two or more.

In addition, various embodiments of the present disclosure may be implemented in hardware, firmware, software, or a combination thereof. In the case of implementing the present invention by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

What is claimed is:

1. A source routing method in an information centric network (ICN), the source routing method comprising:

receiving an interest packet;

extracting a current entry value when the received interest packet includes a forwarding hint, wherein the forwarding hint comprises a path list, the current entry value, and a last entry value, the current entry value indicates a path to be currently processed among all paths in the path list, and the last entry value refers to a number of entries of the path list;

using the extracted current entry value as an index of the path list;

extracting a name of the interest packet;

reducing the current entry value when the interest packet is transmitted to a network area of the path list;

performing a forwarding information base (FIB) lookup with the extracted name;

determining a next path using the FIB lookup; and transmitting the interest packet to the next path.

2. The source routing method of claim 1, further comprising:

extracting a name of the interest packet when the interest packet does not include the forwarding hint; and looking up a FIB with the extracted name and transmitting the interest packet to a next path.

3. The source routing method of claim 1, further comprising performing basic forwarding hint processing when a last entry is 0.

4. The source routing method of claim 1, further comprising reducing the current entry value by one when the interest packet is transmitted to the network area of the path list.

5. The source routing method of claim 1, wherein the performing the FIB lookup with the extracted name further comprises extracting a name of an entry with highest priority from the forwarding hint and performing the FIB lookup.

6. The source routing method of claim 1, wherein, when a name included in the interest packet and a name included in the forwarding hint conflict, the name of the forwarding hint is extracted and the FIB lookup is performed.

7. The source routing method of claim 1, wherein the network area is set equally in at least one node.

8. The source routing method of claim 1, wherein the determining the next path further comprises determining, as a next path, a path having a shortest delay time among a plurality of paths.

9. A source routing apparatus in an information centric network (ICN), the source routing apparatus comprising:

an input port configured to receive an interest packet;

a routing processor configured to:

extract a current entry value when the received interest packet includes a forwarding hint, wherein the forwarding hint comprises a path list, the current entry value, and a last entry value, the current entry value indicates a path to be currently processed among all paths in the path list, and the last entry value refers to a number of entries of the path list, use the extracted current entry value as an index of the path list, extract a name of the interest packet, reduce the current entry value when the interest packet is transmitted to a network area of the path list, perform a forwarding information base (FIB) lookup with the extracted name, and determine a next path using the FIB lookup; and an output port configured to output the interest packet to the next path.

10. The source routing apparatus of claim 9, wherein the routing processor is configured to:

extract a name of the interest packet when the interest packet does not include the forwarding hint; and look up a FIB with the extracted name and transmitting the interest packet to the output port.

11. The source routing apparatus of claim 9, wherein the routing processor is configured to perform basic forwarding hint processing when a last entry is 0.

12. The source routing apparatus of claim 9, wherein the routing processor is configured to reduce the current entry value by one when the interest packet is transmitted to the network area of the path list.

13. The source routing apparatus of claim 9, wherein the routing processor is configured to extract a name of an entry with highest priority from the forwarding hint and to perform the FIB lookup.

14. The source routing apparatus of claim 12, wherein the routing processor is configured to extract the name of the forwarding hint and to perform the FIB lookup when a name included in the interest packet and a name included in the forwarding hint conflict.

15. The source routing apparatus of claim 9, wherein the network area is set equally in at least one node.

16. A source routing apparatus in an information centric network (ICN), the source routing apparatus comprising:

a transceiver configured to transmit and receive an interest packet and to transmit the interest packet to a next path;

a processor configured to:

extract a current entry value when the received interest packet includes a forwarding hint, wherein the forwarding hint comprises a path list, the current entry value, and a last entry value, the current entry value indicates a path to be currently processed among all paths in the path list, and the last entry value refers to a number of entries of the path list, use the extracted current entry value as an index of the path list, extract a name of the interest packet, reduce the current entry value when the interest packet is transmitted to a network area of the path list, perform a forwarding information base (FIB) lookup with the extracted name, and determine a next path using the FIB lookup; and a memory configured to store routing information.

* * * * *